United States Patent
Giessler-Blank et al.

(10) Patent No.: US 7,670,422 B2
(45) Date of Patent: Mar. 2, 2010

(54) STORAGE-STABLE COATING COMPOSITION FOR ABRASION-RESISTANTLY AND WEATHERING-STABLY PROVIDING SMOOTH INORGANIC SURFACES WITH EASY-TO-CLEAN PROPERTIES

(75) Inventors: Sabine Giessler-Blank, Dortmund (DE); Eckhard Just, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 8 days.

(21) Appl. No.: 12/096,647

(22) PCT Filed: Nov. 15, 2006

(86) PCT No.: PCT/EP2006/068481

§ 371 (c)(1),
(2), (4) Date: Jun. 9, 2008

(87) PCT Pub. No.: WO2007/068544

PCT Pub. Date: Jun. 21, 2007

(65) Prior Publication Data

US 2009/0011246 A1    Jan. 8, 2009

(30) Foreign Application Priority Data

Dec. 15, 2005    (DE) .................... 10 2005 060 402

(51) Int. Cl.
   *C09D 4/00*    (2006.01)
(52) U.S. Cl. .............................. 106/287.14; 106/287.13
(58) Field of Classification Search ............ 106/287.14, 106/287.13
   See application file for complete search history.

(56) References Cited

U.S. PATENT DOCUMENTS

| 5,997,943 | A | * | 12/1999 | Azzopardi et al. | .......... 427/167 |
| 6,177,582 | B1 | | 1/2001 | Jenkner et al. | |
| 6,251,989 | B1 | | 6/2001 | Edelmann et al. | |
| 6,361,871 | B1 | | 3/2002 | Jenkner et al. | |
| 6,426,150 | B1 | | 7/2002 | Jenkner et al. | |
| 6,713,186 | B1 | | 3/2004 | Jenkner et al. | |
| 7,578,877 | B2 | * | 8/2009 | Giessler et al. | ........ 106/287.13 |
| 2002/0192385 | A1 | | 12/2002 | Jenkner et al. | |
| 2006/0185555 | A1 | | 8/2006 | Giessler et al. | |
| 2006/0204767 | A1 | | 9/2006 | Albert et al. | |
| 2007/0054056 | A1 | | 3/2007 | Albert et al. | |

FOREIGN PATENT DOCUMENTS

EP    0 799 873    10/1997

OTHER PUBLICATIONS

U.S. Appl. No. 11/572,555, filed Jan. 23, 2007, Just, et al.
U.S. Appl. No. 12/090,327, filed Apr. 15, 2008, Giessler, et al.

* cited by examiner

*Primary Examiner*—David M Brunsman
(74) *Attorney, Agent, or Firm*—Oblon, Spivak, McClelland, Maier & Neustadt, L.L.P.

(57) ABSTRACT

The present invention relates to a special coating composition based on components a) at least one hydrolyzable fluoroalkylsilane of the formula (I) CF3(CF2)n(CH2)2Si(CH3)yX3-y (I), in which X is a group from the series chlorine, methoxy, ethoxy, isopropoxy, and n-propoxy and n is a number from the series 3, 4, 5, 6, 7, 8, and 9, and y is 0 or 1, b) HCl, c) water, d) isopropanol, and e) dodecane, and on a silane component (a): water molar ratio of 1:4.5 to 1:9. The invention further relates to a process for preparing such a composition and also to its use for providing smooth, inorganic substrate surfaces with an abrasion-resistant and weathering-stable easy-to-clean coating.

12 Claims, 1 Drawing Sheet

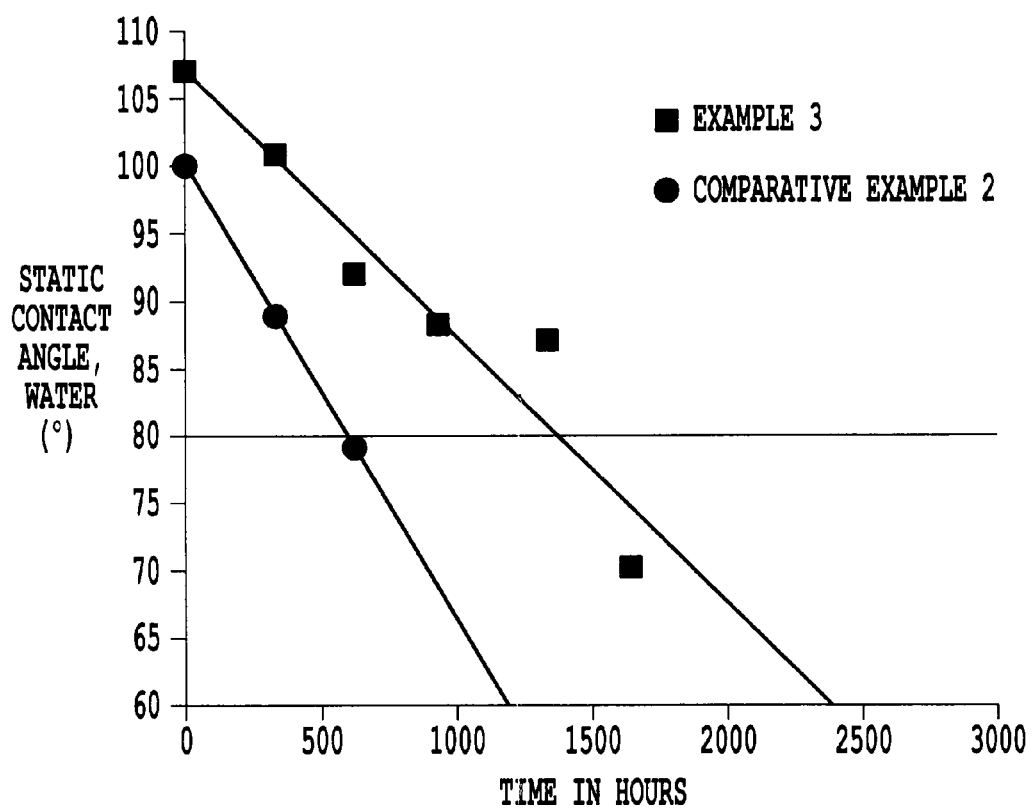

STORAGE-STABLE COATING COMPOSITION FOR ABRASION-RESISTANTLY AND WEATHERING-STABLY PROVIDING SMOOTH INORGANIC SURFACES WITH EASY-TO-CLEAN PROPERTIES

This application is a 371 filing of PCT/EP2006/068481, filed Nov. 15, 2006.

The present invention relates to a new coating composition for providing surfaces with an oil-, water-, and dirt-repellent coating. The invention further relates to a process for preparing the new composition and also to its use.

Surfaces with oil, water, and dirt repellency properties are referred to in the everyday art as "easy to clean".

Easy-to-clean coatings based on alkylsilanes and/or fluoroalkylsilanes are well known (from GB GB 935 380, U.S. Pat. No. 3,012,006, U.S. Pat. No. 3,354,022, JP 2001/115151, DE 834 002, DE 15 18 551, DE 38 36 815, DE 42 18 657, DE 195 44 763, EP 0 492 417, EP 0 513 727, EP 0 548 775, EP 0 657 393, EP 0 672 779, EP 0 799 873, EP 0 846 716, EP 1 033 395, EP 1 101 787, WO 95/23830, WO 00/063312, and WO 05/014731, among many others).

Of the existing coating systems, those based on fluoroorgano-functional silanes and/or siloxanes are the most suitable in terms of their easy-clean properties. Systems described for producing an easy-to-clean coating include corresponding 100% systems, solvent-containing systems, emulsions, and aqueous systems.

Coating systems from EP 0 825 157 A2, EP 0 947 478 A1 and WO 99/014284 contain hydrolysates or condensates based on hydrolyzable, fluoroalkyl-functional organosilanes, and emphasize the use of nitric acid as a catalyst along with a purposively guided hydrolysis and condensation. Other acids are said to be less suitable as catalysts. Compositions of this kind may additionally comprise organic solvents, such as lower alcohols, ethers, and ketones.

The products already on the market have only a comparatively short storage stability or low abrasion resistance in coatings obtained using them. Furthermore, many systems lose their activity after only a short time, particularly in terms of the oleophobic effect. Moreover, there is increased demand for better weathering stability.

BRIEF DESCRIPTION OF THE DRAWING

FIG. 1 displays the results of accelerated weathering for the coating obtained on glass.

It was an object of the present invention to provide a further coating system, marrying maximum storage stability with effectiveness, for easy-clean applications. A particular concern on the part of the invention was to provide a system suitable for an abrasion-resistant and weathering-stable easy-to-clean coating on smooth, substantially inorganic surfaces.

The stated object is solved in accordance with the invention as specified in the claims.

Thus it has been found, surprisingly, that a storage-stable, easy-to-clean coating composition based on components a) at least one hydrolyzable fluoroalkylsilane of the formula (I)

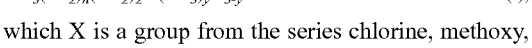

in which X is a group from the series chlorine, methoxy, ethoxy, isopropoxy, and n-propoxy and n is a number from the series 3, 4, 5, 6, 7, 8, and 9, and y is 0 or 1, b) HCl,
c) water,
d) isopropanol, and
e) dodecane, preferably n-dodecane, and on a silane component (a): water molar ratio of 1:4.5 to 1:9 can be advantageously applied, simply and economically, effectively and durably, particularly to a smooth, substantially—but not exclusively—inorganic substrate surface and in outdoor applications in particular.

Hence the compositions of the invention are notable for an outstanding storage stability of at least one year. In addition it is surprising that the systems of the invention, which contain HCl as catalyst, are in fact notable, following application, for outstanding easy-clean properties, excellent abrasion resistance, and, at the same time, high weathering stability and chemical resistance.

The present invention accordingly provides a coating composition based on components a) at least one hydrolyzable fluoroalkylsilane of the formula (I)

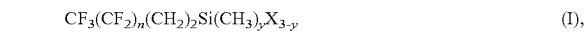

in which X is a group from the series chlorine, methoxy, ethoxy, isopropoxy, and n-propoxy and n is a number from the series 3, 4, 5, 6, 7, 8, and 9, and y is 0 or 1, b) HCl,
c) water,
d) isopropanol, and
e) dodecane, and on a silane component (a): water molar ratio of 1:4.5 to 1:9, preferably 1:4.8 to 1:7, more preferably 1:5 to 1:6.

A composition of the invention preferably comprises
a) 20 parts by weight of fluoroalkylsilane component of the formula (I),
b) 0.05 to 0.15 part by weight of HCl, preferably 0.07 to 0.12 part by weight, more preferably 0.074 to 0.11 part by weight of HCl,
c) 3.2 to 6.4 parts by weight of $H_2O$, preferably 3.6 to 6 parts by weight, more preferably 3.7 to 4.2 parts by weight, in particular 3.8 to 4.0 parts by weight of $H_2O$,
d) 500 to 1000 parts by weight of isopropanol, preferably 600 to 900 parts by weight of isopropanol, and
e) 30 to 60 parts by weight of dodecane, preferably 40 to 50 parts by weight of dodecane.

Preference is given in particular to a silane component (a): water molar ratio of 1:5.3 to 1:5.8.

A coating composition of the invention of this kind is advantageously obtainable by diluting the silane component (a) with isopropanol and subjecting it in the presence of HCl to partial, i.e., controlled, hydrolysis and also to condensation, the silane component (a): water molar ratio being 1:4.5 to 1:9, and subsequently diluting the reaction mixture thus obtained with an isopropanol- and dodecane-containing mixture.

The present invention also provides in particular a process for preparing a composition of the invention, by diluting the silane component (a) with isopropanol, then adding water and then hydrochloric acid, stirring the mixture thus obtained for 1 to 4 hours, preferably for 2 to 3 hours, at a temperature of 0 to 80° C., preferably of room temperature to 40° C. and the hydrolysis step being based on a silane component (a): water molar ratio of 1:4.5 to 1:9 (partial hydrolysis and condensation called hydrolysis step for short), and subsequently diluting the reaction mixture thus obtained (and called hydrolysate for short) with a mixture of isopropanol and dodecane or adding silane component (a) to a mixture of isopropanol, water, and hydrochloric acid, stirring the mixture thus obtained for 1 to 4 hours, preferably 2 to 3 hours, at a temperature of 0 to 80° C., preferably of room temperature to 40° C., the hydrolysis step being based on a silane component (a): water molar ratio of 1:4.5 to 1:9 (partial hydrolysis and condensation called hydrolysis step for short) and subsequently diluting the reaction mixture thus obtained (and called hydrolysate for short) with a mixture of components (d), (e), and hydrochloric acid.

In the process of the invention the components are employed preferably in an amount of
a) 20 parts by weight of fluoroalkylsilane of formula (I),
b) 0.05 to 0.15 part by weight of HCl,
c) 3.2 to 6.4 parts by weight of $H_2O$,
d) 500 to 1000 parts by weight of isopropanol, and
e) 30 to 60 parts by weight of dodecane.

Particular preference is given to employing 1 to 1.5 parts by weight of component (d) per part by weight of component (a) in the hydrolysis step.

Additionally it is preferred in the process of the invention to employ 40% to 100% by weight of component (b) in the hydrolysis step.

Furthermore, preference is given in the process of the invention to diluting the inventively obtained hydrolysate with a mixture of component (e) and the remainder of component (d) or with a mixture of component (e), the remainder of component (d), and the remainder of component (b).

Thus in the process of the invention as component (a) it is possible for example—but not exclusively—to use $CF_3$—$(CF_2)_5$—$(CH_2)_2$—$Si(OCH_3)_3$, $CF_3$—$(CF_2)_5$—$(CH_2)_2$—$Si(OC_2H_5)_3$, $CF_3$—$(CF_2)_5$—$(CH_2)_2$—$SiCl_3$, $CF_3$—$(CF_2)_5$—$(CH_2)_2$—$Si(CH_3)Cl_2$, $CF_3$—$(CF_2)_7$—$(CH_2)_2$—$SiCl_3$, $CF_3$—$(CF_2)_7$—$(CH_2)_2$—$Si(OCH_3)_3$, $CF_3$—$(CF_2)_7$—$(CH_2)_2$—$Si(OC_2H_5)_3$, $C_{10}F_{21}$—$(CH_2)_2$—$Si(OCH_3)_3$, $C_{10}F_{21}$—$(CH_2)_2$—$Si(OC_2H_5)_3$, $C_{10}F_{21}$—$(CH_2)_2$—$SiCl_3$ or a mixture of at least two of the hydrolyzable fluoroalkylsilanes of formula (I).

As component (b) it is preferred to use an aqueous HCl solution, in particular a 37% strength hydrochloric acid solution. Alternatively the HCl component can be generated under hydrolysis conditions by the corresponding proportional use of a chlorosilane—cf. formula (I) in particular. A further alternative is to supply the HCl to the system in gas form, by introducing it correspondingly into the mixture of components a), c), and d) for example.

Water as component (c) may already be present—at least proportionally—in component (b) or else can be used separately or additionally in the form of fully deionized water or distilled water.

Component (d), i.e., isopropanol, and component (e), dodecane, can each be used in the respective commercially customary forms; for example, in pure form, i.e., in particular, in the case of (e) n-dodecane or an isomer mixture based substantially on dodecanes and having a boiling range of more than 180° C.

In general the inventive process is carried out as follows:

In general the silane component of formula (I) is normally subjected to controlled hydrolysis and condensation in the presence of defined amounts of HCl and isopropanol, the silane component (a): water molar ratio being set at 1:4.5 to 1:9. Usually the reaction is carried out advantageously with effective mixing and at a temperature in the range from 0 to 80° C., in particular at room temperature, for a time of 1 to 4 hours. The hydrolysate thus obtained is subsequently diluted with an isopropanol/dodecane-containing mixture, advantageously giving a storage-stable and effective coating composition. For the controlled dilution of the reaction mixture or hydrolysate, however, it is also possible to use a mixture of a corresponding amount of isopropanol, dodecane, and HCl, instead of the isopropanol/dodecane-containing mixture. Alternatively the aforementioned substances can each be used as individual components.

Advantageously in this way a coating composition of the invention is obtained which has a storage stability of at least 1 year and which, when applied to a smooth, substantially inorganic substrate surface, produces a particularly abrasion-resistant and weathering-stable, easy-to-clean coating.

Coatings of the invention are likewise notable for hydrophobic and oleophobic properties which also retain their effects over a prolonged period of time.

The coating system of the invention can in particular be employed advantageously on glass or glazes, such as on windscreens, glass shower cabins, wall tiles, and sanitary ceramics.

The way in which a coating composition of the invention is applied to a smooth, substantially inorganic substrate surface is appropriately as follows:

the substrate surface is appropriately first cleaned, particularly to remove dust and grease, and if desired is activated. This can be done using, for example, isopropanol, acetone or a commercial glass cleaner. Activation can then take place using, for example, an abrasive, aqueous agent that preferably contains oxidic particles having an average particle diameter ($d_{50}$) of less than 6 μm, preferably 0.05 to 5 μm. Abrasive media of this kind may be in the form of a suspension, dispersion or paste. Corresponding aqueous and/or alcoholic metal slurries contain preferably cerium oxide, aluminum oxide, aluminum hydroxide, magnesium oxide, iron oxide, titanium oxide, aluminum silicate, silicon oxides, or a mixture of aforementioned oxides. Such a composition may advantageously have an alkaline or acidic formulation.

The coating composition of the invention can be applied advantageously by dipping, spraying, squirting, wiping, polishing or buffing to the prepared substrate surface, preferably at a temperature of 5 to 30° C., in particular at 10 to 25° C., and a relative humidity of 30% to 80%, in particular at around 50% to 60% relative humidity, and allowed to harden and react.

In general a coating composition applied in this way displays its advantageous effect after just a few minutes. Following the coating step it is possible if desired to carry out thermal aftertreatment at a temperature of 40 to 250° C. for approximately 10 minutes. In general, however, this coating is simply left to dry under ambient conditions. It is particularly advantageous if the coating is allowed to harden at a temperature of approximately 25° C. for approximately 1 day, during which no water is applied to the freshly coated area.

The present invention hence additionally provides for the use of a composition of the invention for equipping smooth, substantially inorganic substrate surfaces with an abrasion-resistant and weathering-stable, easy-to-clean coating, especially metal, glass, ceramic or glazed surfaces, such as windscreens, shower cabins, windows, doors, wall tiles, and other sanitary ceramics or sanitary fittings, to name but a few examples, and additionally substrate surfaces based on polycarbonate, polymethyl methacrylate (PMMA), polyurethane (PU), and polystyrene.

The present invention is elucidated in more detail by the following examples, without restriction of its subject matter.

EXAMPLES

The reactions indicated below in the examples were each carried out in a heatable and coolable glass apparatus with stirrer, metering means, condenser, water bath, and thermometer.

pH values were each determined 1:1 in water in accordance with DIN 19 268.

Example 1

A 100 ml glass stirring apparatus with metering means, reflux condenser, and water bath was charged with 20 g of Dynasylan® F 8261 (tridecafluoro-1,1,2,2-tetrahydrooctyltriethoxysilane), 26 g of isopropanol, 4 g of deionized water, and 0.2 g of hydrochloric acid (37% HCl). The molar silane:water ratio was 1:5.6.

Immediately after the addition of the hydrochloric acid the temperature rose within 5 minutes to 30° C. The batch was subsequently stirred at 26° C. for 3 hours. It was then diluted with 900 g of isopropanol and 50 g of dodecane in a 2 l glass bottle to give the ready-to-use coating material. The composition corresponded to an active substance content of 2% by weight Dynasylan® F 8261, 5% by weight n-dodecane, and 93% by weight isopropanol, pH=3.2.

Example 2

A 100 ml glass stirring apparatus with metering means, reflux condenser, and water bath was charged with 20 g of Dynasylan® F 8261 (tridecafluoro-1,1,2,2-tetrahydrooctyltriethoxysilane), 26 g of isopropanol, 4 g of deionized water, and 0.2 g of hydrochloric acid (37% HCl). The molar silane:water ratio was 1:5.6.

Immediately after the addition of the hydrochloric acid the temperature rose within 5 minutes to 30° C. The batch was subsequently stirred at 26° C. for 3 hours. It was then diluted with 584 g of isopropanol and 33 g of dodecane in a 1 l glass bottle to give the ready-to-use coating material. The composition corresponded to an active substance content of 3% by weight Dynasylan® F 8261, 5% by weight n-dodecane, and 92% by weight isopropanol, pH=3.0.

Example 3

A 100 ml glass stirring apparatus with metering means, reflux condenser, and water bath was charged in succession with 26.0 g of isopropanol and 20 g of Dynasylan® F 8261 (tridecafluoro-1,1,2,2-tetrahydrooctyltriethoxysilane) with stirring, and these constituents were mixed. At a liquid-phase temperature of 22° C., 3.8 g of deionized water, and 0.2 g of hydrochloric acid (37% HCl) were added with stirring. The molar silane:water ratio was 1:5.4.

Immediately after the addition of the hydrochloric acid the temperature rose within 5 minutes to 30° C. The batch was subsequently stirred at 26° C. for 3 hours. It was then diluted with 900 g of isopropanol, 50 g of dodecane, and 0.1 g of hydrochloric acid (37% HCl) in a 2 l glass bottle to give the ready-to-use coating material. The composition corresponded to an active substance content of 2% by weight Dynasylan® F 8261, 5% by weight n-dodecane, and 92% by weight isopropanol, pH=3.1.

Example 4

A 100 ml glass stirring apparatus with metering means, reflux condenser, and water bath was charged with 20 g of Dynasylan® F 8261 (tridecafluoro-1,1,2,2-tetrahydrooctyltriethoxysilane), 26 g of isopropanol, 4 g of deionized water, and 0.2 g of hydrochloric acid (37% HCl). The molar silane:water ratio was 1:5.6.

Immediately after the addition of the hydrochloric acid the temperature rose within 5 minutes to 30° C. The batch was subsequently stirred at 26° C. for 3 hours. It was then diluted with 584 g of isopropanol, 33 g of dodecane, and 0.1 g of hydrochloric acid (37% HCl) in a 1 l glass bottle to give the ready-to-use coating material. The composition corresponded to an active substance content of 3% by weight Dynasylan® F 8261, 5% by weight n-dodecane, and 92% by weight isopropanol, pH=3.

Performance Investigations on Glass Surfaces

Pretreatment of the glass surface to be coated (size of glass plates: 0.07 m×0.15 m): The glass plates were first cleaned with isopropanol and abrasively activated with an aqueous slurry of cerium oxide, after which the dried-on cerium oxide was removed fully with a paper towel.

The ready-to-use formulations from Examples 1 to 4, and also from Comparative Examples 1 and 2, were distributed as a film of liquid on the glass surface, rubbed using a paper towel, polished off, and tested for abrasion resistance after 2 days. In the majority of cases a hydrophobic effect was produced directly after polishing in at room temperature.

Abrasion Resistance

The abrasion test was carried out under an abrasive solution in an abrasion machine from Gardner.

The test apparatus used was an abrasion tester from Gardner, 250 ml glass beaker with stirring bar, magnetic stirrer, and balance. The abrasion test was carried out along the lines of the Erichsen test of DIN 53 778, Part 2, but with the brushes replaced by a scouring sponge. Hence the test was carried out with a Glitzi scouring sponge and an applied weight of 1 kg over a surface area of 7.5×10.4 cm. The mechanical installation glided in parallel on the substrate. One backward and forward movement is termed a cycle. The lubricant used was a 3% strength by weight aqueous solution of aluminum silicate (the aluminum silicate particles had a size of approximately 80 µm). Prior to the commencement of the abrasion test, the water contact angles (CA) of the freshly coated glass plates (identification: unexposed) were measured first of all.

Below contact angles of 80°, coatings are no longer referred to as easy to clean; consequently, the measurements were terminated when this figure had been reached. The static contact angles (CA) with deionized water were measured multiply for this purpose, using the contact angle measuring apparatus G-15 from KRÜSS (DIN 828), both before and after the respective abrasion cycles. To check the oleophobic properties, the static contact angle with Kaydol (a mineral oil from Crompton Corporation, CAS no. 8012-95-1), was determined prior to abrasion exposure. In the tables below, this is abbreviated to CA Kaydol.

Contact angle measurement error: ±4°.

The results of the respective tests can be seen from the tables.

Chemical Resistance (Alkali and Acid)

Coated samples were placed fully in the respective test solution at room temperature. After 2 hours the samples were rinsed off under running water and dried off with a paper towel. The hydrophobic properties of the exposed coating were then determined by means of multiple contact angle measurement in accordance with DIN 828 (identification: exposed). The coating was considered worn if the contact angle was <80°.

Test solutions: 0.1 molar $H_2SO_4$ and 0.1 molar NaOH

Investigations on Storage Stability and Accelerated Weathering

To determine the storage stability, the formulations of the examples were stored in a forced-air drying cabinet at 60° C. After different periods of time (e.g., 1 or 2 months) glass plates were coated and the abrasion resistance was examined; cf. also Table 7. Additionally, the products of the examples were stored at room temperature (RT), i.e., 20 to 26° C. The storage time is also identified as pot life. The storage time was tested from the beginning (i.e., days) up to several months. The following correlation serves for comparison:

| 1 month of storage at 60° C. corresponds in theory: (at constant storage temperature) | |
| --- | --- |
| Storage at | Time (theoretical) |
| 20° C. | 16 months |
| 30° C. | 8 months |
| 40° C. | 4 months |
| 50° C. | 2 months |

Accelerated weathering test to EN ISO 11507 (QUV-Spray accelerated weathering apparatus from Q-Panel Lab Products)

Type 1 lamps to ISO 4892-3 (UV-A 340), emission peak at 340 nm, radiation intensity on sample surface: 0.92 $W/m^2$ at 340 nm.

1 weathering cycle (8 hours): 4 hours of irradiation cycle at 60° C., then 3 hours 55 minutes of condensation cycle and 5 minutes of water sprinkling.

TABLE 1

Results for the oleophobic properties and for the abrasion resistance of the coating on glass obtained with the material from Example 1

| | | CA [°] $H_2O$ after number of cycles of abrasion exposure × 1000 | | | | | | | | |
| --- | --- | --- | --- | --- | --- | --- | --- | --- | --- | --- |
| Pot life | CA Kaydol [°] | 0 (unexposed) | 1 | 2 | 4 | 6 | 8 | 10 | 12 | 14 | 16 |
| 8 days RT | 78 | 113 | 99 | 103 | 96 | 95 | 95 | 73 | — | — | — |
| 4 months 60° C. | 78 | 106 | 100 | 92 | 84 | 80 | — | — | — | — | — |

TABLE 2

Results for the oleophobic properties and for the abrasion resistance of the coating on glass obtained with the material from Example 2

| | | CA [°] $H_2O$ after number of cycles of abrasion exposure × 1000 | | | | | | | | |
| --- | --- | --- | --- | --- | --- | --- | --- | --- | --- | --- |
| Pot life | CA Kaydol [°] | 0 (unexposed) | 1 | 2 | 4 | 6 | 8 | 10 | 12 | 14 | 16 |
| 2 days RT | 73 | 111 | 101 | 102 | 96 | 93 | 92 | 88 | 80 | — | — |
| 4 months 60° C. | 85 | 104 | 104 | 102 | 98 | 99 | 94 | 84 | 78 | — | — |
| 5 months 60° C. | 77 | 106 | 99 | 91 | 89 | 75 | — | — | — | — | — |

TABLE 3

Results for the oleophobic properties and for the abrasion resistance of the coating on glass obtained with the material from Example 3

| | | CA [°] $H_2O$ after number of cycles of abrasion exposure × 1000 | | | | | | | | |
| --- | --- | --- | --- | --- | --- | --- | --- | --- | --- | --- |
| Pot life | CA Kaydol [°] | 0 (unexposed) | 1 | 2 | 4 | 6 | 8 | 10 | 12 | 14 | 16 |
| 2 days | 82 | 111 | 100 | 99 | 94 | 87 | 87 | 77 | — | — | — |
| 1 month RT | 78 | 109 | 101 | 100 | 94 | 86 | 77 | — | — | — | — |
| 1 month 60° C. | 77 | 110 | 100 | 101 | 94 | 86 | 76 | — | — | — | — |
| 2 months 60° C. | 79 | 108 | 101 | 92 | 90 | 72 | — | — | — | — | — |

TABLE 4

Results for the oleophobic properties and for the abrasion resistance of the coating on glass obtained with the material from Example 4

| | | | CA [°] H$_2$O after number of cycles of abrasion exposure × 1000 | | | | | | | | | |
|---|---|---|---|---|---|---|---|---|---|---|---|---|
| Pot life | CA Kaydol [°] | 0 (unexposed) | 1 | 2 | 4 | 6 | 8 | 10 | 12 | 14 | 16 |
| 1 month RT | 83 | 109 | 103 | 101 | 100 | 96 | 95 | 92 | 87 | — | — |
| 1 month 60° C. | 78 | 108 | 103 | 99 | 94 | 93 | 90 | 85 | 78 | — | — |
| 2 months 60° C. | 79 | 104 | 97 | 92 | 86 | 75 | — | — | — | — | — |

Comparative Example 1

25.8 g of isopropanol, 4.0 g of deionized water, 0.2 g of nitric acid (37% HNO$_3$) were introduced in succession and mixed. Then 20 g of Dynasylan® F 8261 (tridecafluoro-1,1,2,2-tetrahydrooctyltriethoxysilane) were added and the mixture was stirred at room temperature for 3 hours. The batch was then diluted with a mixture composed of 900 g of isopropanol, 50 g of dodecane, and 0.1 g of nitric acid (37% HNO$_3$) to give the ready-to-use coating material. The molar silane:water ratio was 1:5.6. The composition corresponded to an active substance content of 2% by weight Dynasylan® F 8261, 5% by weight n-dodecane, and 92% by weight isopropanol, pH=3.

Comparative Example 2

The system is based on an activated fluoroalkyltrialkoxysilane in alcoholic solution. The molar silane/water ratio was 1:3.6. 5.0 g of Dynasylan® F 8261, 1.0 g of hydrochloric acid (37% HCl), 493.5 g of isopropanol, and 0.5 g of SnCl$_2$×2H$_2$O were stirred at room temperature in a glass bottle for 3 hours. The composition corresponded to 1.0% by weight Dynasylan® F 8261, 0.126% by weight H$_2$O, 0.074% by weight HCl (absolute), 0.1% by weight SnCl$_2$×2H$_2$O, and 98.7% by weight isopropanol (cf. DE 199 04 132).

TABLE 5

Results for the oleophobic properties and for the abrasion resistance of the coating on glass obtained with the material from Comparative Example 1

| | | | CA [°] H$_2$O after number of cycles of abrasion exposure × 1000 | | | | | | | | | |
|---|---|---|---|---|---|---|---|---|---|---|---|---|
| Pot life | CA Kaydol [°] | 0 (unexposed) | 1 | 2 | 4 | 6 | 8 | 10 | 12 | 14 | 16 |
| 1 month RT | 78 | 108 | 101 | 99 | 88 | 81 | 75 | — | — | — | — |
| 1 month 60° C. | 77 | 112 | 100 | 96 | 88 | 86 | 73 | — | — | — | — |
| 2 months 60° C. | 68 | 101 | 92 | 74 | — | — | — | — | — | — | — |

TABLE 6

Results for the oleophobic properties and for the abrasion resistance of the coating on glass obtained with the material from Comparative Example 2

| | | | Static CA [°] deionized H$_2$O after number of cycles of abrasion exposure × 1000 | | | | | | | |
|---|---|---|---|---|---|---|---|---|---|---|
| Pot life | CA Kaydol [°] | 0 (unexposed) | 5 | 10 | 20 | 40 | 60 | 80 | 100 | 120 | 140 |
| 1 month at (RT) | 77 | 105 | 88 | 79 | — | — | — | — | — | — | — |
| 11 months old (RT) | 77 | 105 | 71 | — | — | — | — | — | — | — | — |

TABLE 7

Results relating to the chemical resistance of the coatings
on glass in respect of Comparative Example 2 and Example 3

| | | 0.1 molar H$_2$SO$_4$ | | 0.1 molar NaOH | |
|---|---|---|---|---|---|
| Product | Pot life (at RT) | CA unexposed [°] | CA exposed [°] | CA unexposed [°] | CA exposed [°] |
| Comparative Example 2 | 1 month | 104 | 104 | 105 | 94 |
| Comparative Example 2 | 11 months | 105 | 99 | 102 | 65 |
| Example 3 | 1 month | 111 | 108 | 112 | 91 |
| Example 3 | 11 months | 110 | 104 | 110 | 90 |

FIG. 1 displays the results of accelerated weathering for the coating obtained on glass.

What is claimed is:

1. A coating composition based on components
   a) at least one hydrolyzable fluoroalkylsilane of the general formula (I)

$$CF_3(CF_2)_n(CH_2)_2Si(CH_3)_yX_{3-y} \quad (I),$$

in which X is a group from the series chlorine, methoxy, ethoxy, isopropoxy, and n-propoxy and n is a number from the series 3, 4, 5, 6, 7, 8, and 9, and y is 0 or 1,
   b) HCl,
   c) water,
   d) isopropanol, and
   e) dodecane,
   and on a silane component (a): water molar ratio of 1:4.5 to 1:9.

2. The composition as claimed in claim 1, comprising
   a) 20 parts by weight of fluoroalkylsilane component of the formula (I),
   b) 0.05 to 0.15 part by weight of HCl,
   c) 3.2 to 6.4 parts by weight of H$_2$O,
   d) 500 to 1000 parts by weight of isopropanol, and
   e) 30 to 60 parts by weight of dodecane.

3. The composition as claimed in claim 1, wherein the silane component (a): water molar ratio is 1:5.3 to 1:5.8.

4. The coating composition as claimed in claim 1, which is prepared by diluting the silane component (a) with isopropanol and subjecting it in the presence of HCl to partial hydrolysis and also to condensation, the silane component (a): water molar ratio being 1:4.5 to 1:9, and subsequently diluting the reaction mixture thus obtained with an isopropanol- and dodecane-containing mixture.

5. A process for preparing a coating composition as claimed in claim 1,
   which comprises
   diluting the silane component (a) with isopropanol, then adding water and then hydrochloric acid, stirring the mixture thus obtained for 1 to 4 hours at a temperature of 0 to 80° C., the hydrolysis step being based on a silane component (a): water molar ratio of 1:4.5 to 1:9, and subsequently diluting the reaction mixture with a mixture of isopropanol and dodecane
   or
   comprises adding silane component (a) to a mixture of isopropanol, water and hydrochloric acid, stirring the mixture thus obtained for 1 to 4 hours at a temperature of 0 to 80° C., the hydrolysis step being based on a silane component (a): water molar ratio of 1:4.5 to 1:9, and subsequently diluting the reaction mixture with a mixture of isopropanol, dodecane, and hydrochloric acid.

6. The process as claimed in claim 5, wherein the components are employed in the following amounts:
   a) 20 parts by weight of fluoroalkylsilane of formula (I),
   b) 0.05 to 0.15 part by weight of HCl,
   c) 3.2 to 6.4 parts by weight of H$_2$O,
   d) 500 to 1000 parts by weight of isopropanol, and
   e) 30 to 60 parts by weight of dodecane.

7. The process as claimed in claim 5,
   wherein 1 to 1.5 parts by weight of component (d) are used per part by weight of component (a) in the hydrolysis step.

8. The process as claimed in claim 5,
   wherein 40% to 100% by weight of component (b) is used in the hydrolysis step.

9. The process as claimed in claim 5,
   wherein n-dodecane or an isomer mixture of C$_{12}$-hydrocarbons having a boiling range of from >180° C. is used as component (e).

10. The process as claimed in claim 5,
    wherein the hydrolysate is diluted with a mixture of component (e) and the remainder of component (d) or with a mixture of component (e), the remainder of component (d), and the remainder of component (b).

11. A method for providing smooth, substantially inorganic substrate surfaces with an abrasion-resistant and weathering-stable easy-to-clean coating comprising using as a coating the composition as claimed in claim 1.

12. The method as claimed in claim 11, wherein the substrate of the surface to be treated is selected from glass, glazes, minerals, metal, ceramic, polycarbonate, polymethyl methacrylate, polyurethane, and polystyrene.

* * * * *